G. O. DEGENER.
COMBINED TYPE WRITING AND COMPUTING MACHINE.
APPLICATION FILED MAY 17, 1911.

1,226,950.

Patented May 22, 1917.
3 SHEETS—SHEET 1.

Witnesses:
J. A. Brophy
G. S. Young

Inventor:
Gustave O. Degener
By C. C. Stickney
Attorney.

G. O. DEGENER.
COMBINED TYPE WRITING AND COMPUTING MACHINE.
APPLICATION FILED MAY 17, 1911.

1,226,950.

Patented May 22, 1917.

Witnesses:
J. A. Brophy
G. S. Young

Inventor:
Gustave O. Degener
By B. C. Stickney
Attorney

UNITED STATES PATENT OFFICE.

GUSTAVE O. DEGENER, OF NEW YORK, N. Y., ASSIGNOR TO UNDERWOOD COMPUTING MACHINE COMPANY, OF NEW YORK, N. Y., A CORPORATION OF NEW YORK.

COMBINED TYPE-WRITING AND COMPUTING MACHINE.

1,226,950.

Specification of Letters Patent.

Patented May 22, 1917.

Application filed May 17, 1911. Serial No. 627,669.

*To all whom it may concern:*

Be it known that I, GUSTAVE O. DEGENER, a citizen of the United States, residing in New York city, in the county of New York and State of New York, have invented certain new and useful Improvements in Combined Type-Writing and Computing Machines, of which the following is a specification.

This invention relates to computing machines, and particularly to combined computing and typewriting machines of the Underwood-Wright type. While the present invention has to do with improvements in the manner of control of the computing devices, particularly the indexing operation, nevertheless, the machine as a whole is rendered more efficient and useful.

I do not claim herein a normally open motor circuit, because the same is disclosed and claimed in a patent granted to me June 20, 1916, No. 1,187,718, in which there is shown a machine of the Underwood-Wright type having the usual escapement wheel carrying a series of pins, for determining how far the computing members are to be driven by a motor, and in said device the motor is normally idle and is connected in driving relation to the indexing wheel by a friction clutch; the circuit to the motor being controlled by any numeral key, and means being provided whereby the circuit is held closed until the escapement action has been completed, when a portion of the escapement mechanism causes the opening of the motor circuit.

Nor do I claim herein a gear variably mutilated by the keys, because such structure is claimed in another patent, issued to me March 12, 1912, No. 1,020,082, in which is shown an Underwood-Wright machine, wherein a constantly-running motor controls the indexing operation of the computing mechanism by means of a gear, capable of being variably mutilated by the numeral keys of a typewriter. In said Patent, 1,020,082, a pinion is shown meshing with said mutilated gear for driving said gear different distances under the control of the keys, the distance driven depending on the point at which the gear is mutilated. In said patent, whenever a key is depressed, the mutilated gear is restored and engaged by the driving pinion, so that the latter turns the gear until the point is reached where the gear has been mutilated by the active key, at which point the gear and pinion run out of mesh and the pinion again rotates idly. A clutch is also provided in said patent, which clutch is under the control of the numeral keys, and arranged to be automatically closed before the computing operation begins, and again released immediately at the close of the computing operation, both the closing and the opening taking place on the up stroke of any key.

In the present application, co-pending with the applications upon which said patents were granted, I use a motor having a circuit normally open, and a series of numeral keys, each numeral key acting to close the motor circuit on its down stroke. I also provide an indexing or computation wheel in the form of a gear which may be variably mutilated and a clutch in the connections between the motor and the indexing wheel, or gear. A driving pinion engages and turns the computation or indexing wheel, when said wheel is restored at a point adjacent the driving pinion. The clutch is closed in the normal position of the parts, but is opened on the down stroke of any key, the opening taking place substantially simultaneously with the closing of the motor circuit, so that the motor which immediately begins to move may not turn the computation gear. The key, as is usual in these machines, also sets an index pin to determine how far the indexing wheel or computation gear shall turn. Thus, the key on its down stroke sets its appropriate index pin, closes the motor circuit and opens the clutch, all of said operations taking place at approximately the same time; the key also on its down stroke causing the gear, which normally stands mutilated at the point adjacent the driving pinion, to be restored at said point, so that the indexing wheel may be driven as soon as the clutch is closed, to cause the driving wheel to move. On the upstroke of the key, and preferably through the medium of the traveling carriage of the typewriter, the clutch is closed and the driving wheel moves the indexing or computation wheel a distance depending upon the key depressed, the motor circuit being automatically opened at the completion of the computing operation, said opening of the motor circuit preferably being under the direct control of the set index pin. One of the advantages of having the clutch normally closed is the longer time which may be allowed for the computing action to take place, while, on account of the intermittent motor, the machine is less noisy and the wear of the parts and the cost of operation are reduced.

Other features and advantages will hereinafter appear.

In the accompanying drawings.

Figure 1:
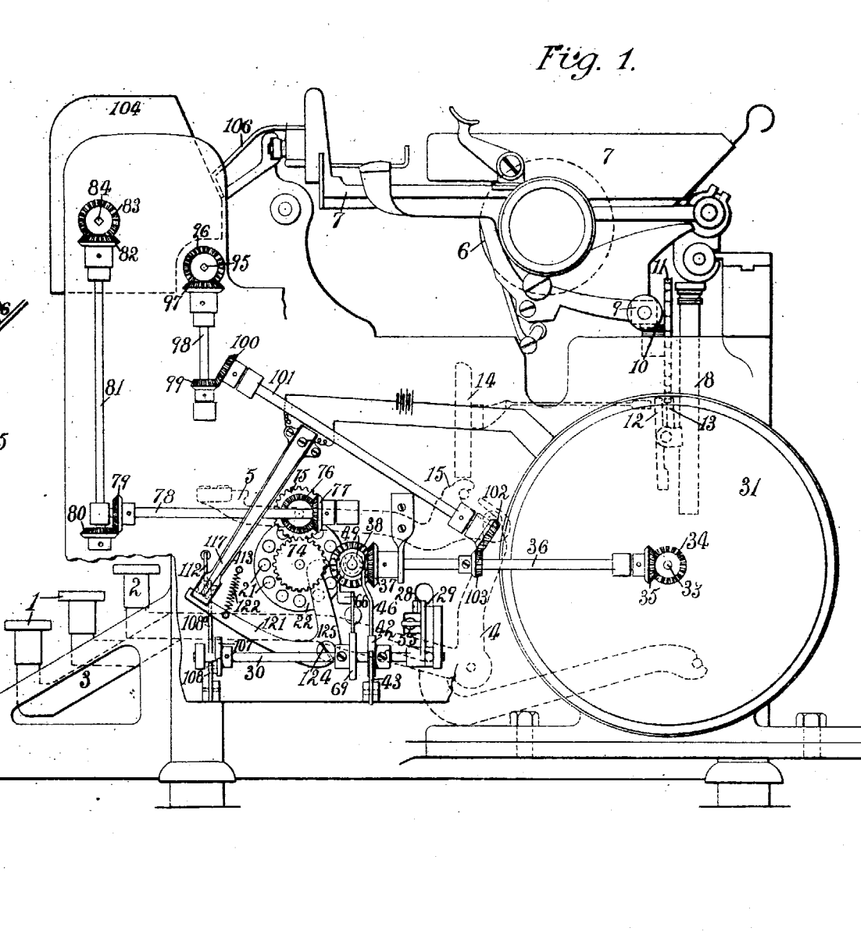
Figure 1 is a side elevation of an Underwood combined typewriting and computing machine embodying the present improvements.

Letter-type keys 1 and numeral type keys 2 are mounted on levers 3, which, by means of sub-levers 4, are connected to type bars 5, to swing them upwardly and rearwardly against a platen 6. This platen is mounted on a carriage 7, propelled by a spring barrel 8, and having a rack 9 meshing with a pinion 10, to which is connected an escapement wheel 11. This wheel is controlled through the usual alphabetical and other type keys, including the keys 1, 2, to cause the carriage to feed at every type stroke. For this purpose, dogs 12, 13 engage the wheel 11, and these dogs are rocked or controlled by means of a universal bar frame 14, which is pressed rearwardly by heels 15 on the type bars.

Figures 3, 4, 5:
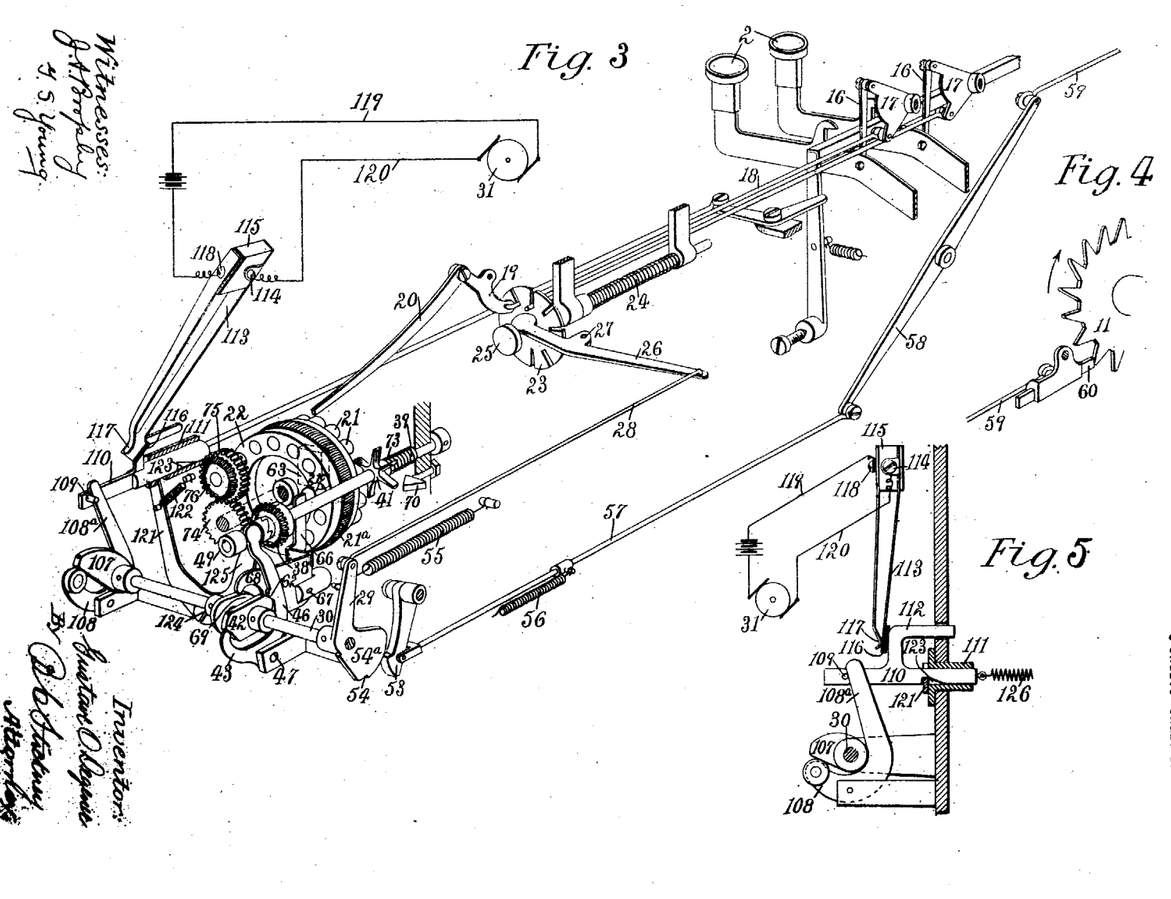
Fig. 3 is a perspective view of the main computation wheel or gear, together with the key-operated means for controlling the same.
Fig. 4 is a view of the escapement wheel of the typewriter, and is to be read in connection with Fig. 3.
Fig. 5 is a rear sectional elevation of the mechanism for controlling the opening and closing of the motor and circuit.

The numeral keys are connected by links 16 to a set of bell cranks 17, and the latter, through links 18 rock levers 19, to which are pivoted jacks 20 grouped in a circle. Any jack may push out any of a circular series of pins 21, which are carried by an index drive or computation wheel 22 connected to the computing wheels and capable of turning any thereof. The pins are detained in either normal or projected positions by a coil-spring band $21^a$, engaging seats or grooves $21^b$ in the pins.

Each of said levers 19 bears upon a universal plate or bar 23 fixed upon a sliding rod 24, said rod carrying a head 25, and one end of a lever 26 being confined between the head 25 and the plate 23, so as to be rocked thereby. This lever is suitably fulcrumed at 27, and at its outer end is connected by a link 28 to an arm 29 fixed upon a horizontal shaft 30. This shaft is intended to operate a clutch mechanism whereby a constantly rotating driver is caused intermittently, at the numeral key strokes, to turn the main computation wheel or driver 22.

The power is furnished by an electrical motor 31, which may be connected by a bevel pinion 34 on motor shaft 33 meshing with a bevel pinion 35 on shaft 36; the latter carrying at its front end a bevel pinion 37 meshing with a bevel pinion 38, loose on a horizontal shaft 39.

Figures 6, 7, 9, 10:
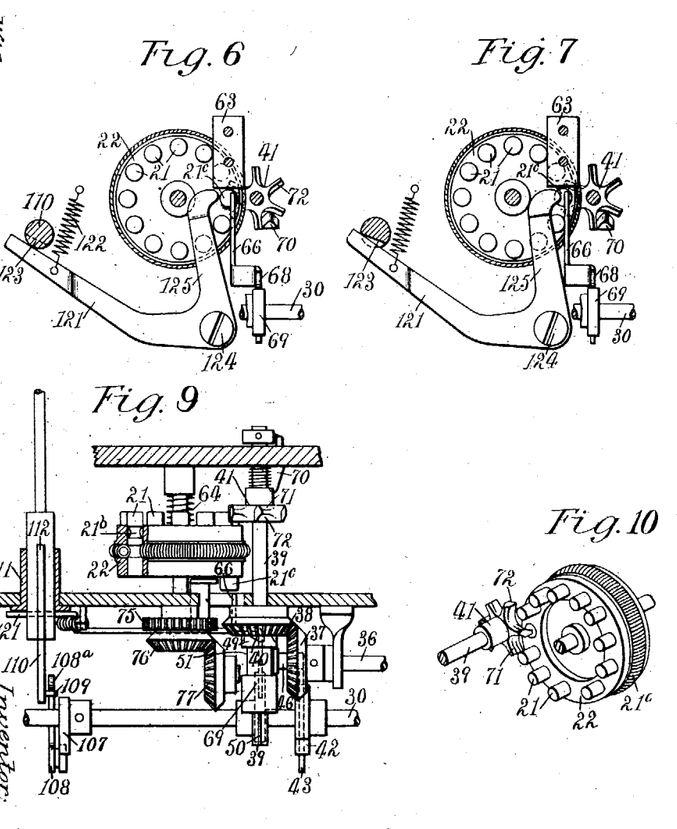
Fig. 6 is a side elevation of the main computation wheel and driving pinion therefor, together with the releasable device for holding the motor circuit closed; said releasable device shown in inoperative position.
Fig. 7 is a view similar to Fig. 6, but showing the releasable device in operative position.
Fig. 9 is a sectional view of the parts seen at Fig. 8.
Fig. 10 is a perspective view of the main computation gear, which is mutilatable, and the pinion which operates the same.
Figure 8:
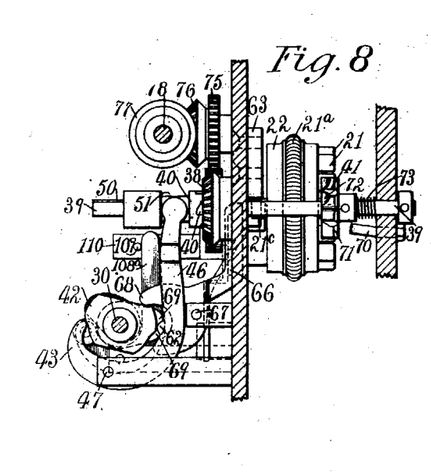
Fig. 8 is a sectional rear elevation of the main computation gear and its connections, and also showing the clutch between the motor and the pinion which meshes with said gear, and the means for operating the clutch.
Figure 11:
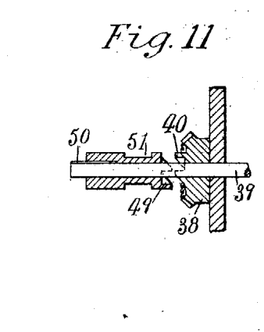
Fig. 11 is a longitudinal sectional view of the clutch which controls the connection between the electrical motor and the pinion seen at Fig. 10.

Upon said pinion 38 is fixed one member 40 of a positive toothed clutch, whose function it is to connect said pinion 38 to the shaft 39, the latter carrying a pinion 41 to mesh with the series of pins or settable teeth 21 on the main computation wheel or driver 22, whereby said pinion 41 can turn said wheel 22 and hence the computing wheels which are connected thereto, the wheel 22 becoming for the time being a gear wheel and so being turned to an extent dependent upon the position thereon of the last-displaced pin 21, that is, upon the point at which the wheel was mutilated by a key.

During the down stroke of key 2 and the rocking of shaft 30, a cam 42 fixed on said shaft rocks downwardly at Fig. 8 to turn an arm 43 provided upon a clutch-controlling or actuating lever 46, which is pivoted at 47 upon a fixture. This movement of the lever 46 opens the clutch, the latter being normally closed. Said movement of the arm 46 withdraws the member 49 from the member 40. The member 49 is in the form of a sleeve which is splined to the shaft 39, as seen at 50, and has a groove 51 to receive the head of lever 46. As will presently be explained, the down stroke of the key 2 closes an electric circuit through the normally stationary motor 31, and hence the wheel 41 may start rotating before the clutch 49 is withdrawn, but such rotation of the wheel 41 will be without effect, since it will merely turn idly in the space left vacant by the previously set pin 21, as seen best in perspective at Fig. 10. Moreover the motor while running at a low starting speed either starts without the load of turning the shaft 39 and the computing mechanism, or is immediately relieved of said load, and thus speeds up more readily.

Preferably, a detent 53 falls into a notch 54 on plate 54ᵃ fixed to the arm 29, at or near the completion of the down stroke of the key 2, so as to prevent said rock shaft from returning prematurely under the influence of its returning spring 55. Said detent 53 is normally idle, riding upon the edge of the plate 54ᵃ, but at or a little before the completion of the down stroke of the key, is caused by a spring 56 to snap into the notch 54, and a rod 57 connected to detent 53 swings a lever 58, to cause the latter to thrust a rod 59 and a pallet 60 thereon into engagement with the tooth of the typewriter-carriage escapement-wheel 11.

At the initial portion of the return stroke of the key 2 (before the latch 53 arrests the returning member 54ᵃ) the escapement wheel 11 is let off, and the pallet 60 is thrust out, thereby returning to normal positions the members 59, 58, 57 and 53, and hence releasing the rock shaft 30, which is immediately returned to normal position by its spring 55.

Upon this return movement of the rock shaft 30, a cam 61 on said rock shaft engages a projection 62 on the lever 46, and swings the latter toward the right to the position seen at Figs. 3 and 8, and thereby closes the clutch 40, 49; so that the movement of the revolving pinion 38 is communicated to the shaft 39 to the special pinion 41 thereon; the function of the latter being to turn the main computation wheel 22 by means of the row of pins 21 projecting therefrom.

The wheel 22 is arrested by the engagement of the end 21ᶜ of the last projected pin 21, which now acts as a stop and abuts with a counter-stop 63 fixed upon the framework; and a friction spring or brake 64, Fig. 9, prevents rebound of the wheel 22. It is obvious that the distance through which the wheel 22 rotates is equal to the distance between the last projected pin and said counter-stop 63; and hence the jacks 20 are placed in such positions, that the depression of any numeral key 2 will cause the projections of a pin 21 at such distance from the stop 63 as to cause the subsequent rotation of wheel 22 to be equal to the number of steps indicated by the depressed key; so that the computing wheels, presently to be described, will be rotated a corresponding distance.

The pinion 41 is so placed, that when the last displaced pin 21, 21ᶜ engages the counter-stop 63, as seen at Figs. 3 and 8, said pinion can rotate idly in the space left vacant by the displacement of said pin, until its motion dies out, or until the last-displaced pin 21, 21ᶜ is returned to normal position.

In order to enable the wheel 22 to be turned again, as will be understood, the displaced pin must be returned to normal position; and for this purpose, an arm 66 is caused to strike that pin and return it to normal position during the down-stroke of the key 2; said arm being pivoted at 67 upon a fixed support, and having a forked member 68 to engage an arm or lug 69 fixed on the rock shaft 30. This arm 69 moves upward at the down-stroke of the key, thereby swinging the arm 66 to the right from the position at Figs. 3 and 8, thereby pushing back the projected pin 21, 21ᶜ to clear the stop 63, and also to enter the space between adjacent teeth of the pinion 41.

In case the returning pin 21 collides with a tooth of the pinion 41, the latter will yield, the shaft 39 for this purpose being movable longitudinally; and a spur or tooth 70 projecting from a part of the framework, will be engaged by a tooth of the pinion 41, and turn the latter to such a position that the pin 21 may thrust between the teeth thereof. Preferably each pinion tooth is beveled on one side at 71 to be engaged by the tooth 70, and on the other side at 72 to be engaged and cammed around by the returning pin 21, in some cases. The pinion can be thus turned, because the depression of a numeral key always frees its shaft 39 from the driving member 40 of the clutch between said shaft and the motor. The tooth 70 will be engaged only when the pinion is in such position that the returning pin 21 engages a pinion tooth and thrusts the pinion back. The shaft 39 and pinion are returned endwise to normal positions by a spring 73 coiled around the shaft.

Figure 2:
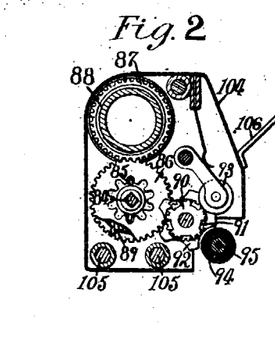
Fig. 2 is a sectional elevation of the usual computing wheels and carriage therefor.

A system of computing wheels 86 is connected to the pin wheel 22 by a train of gearing, which includes a pinion 74 on the shaft of said wheel 22, a pinion 75 meshing with said pinion, a bevel pinion 76 rigid with 75, a bevel pinion 77 meshing with 76, and fixed on a horizontal shaft 78, a bevel pinion 79 on the other end of 78, a bevel pinion 80 on a vertical shaft 81 and meshing with 79; a bevel pinion 82 on the upper end of 81, and a bevel pinion 83 meshing with 82 and secured upon a square shaft 84, upon which there is fixed a master wheel 85 to engage internal teeth formed upon the gang of computing wheels 86; the latter being in the form of spur gears to engage gears 87 formed on number-bearing wheels 88.

The tens-carrying mechanism includes a special tooth 89 provided on each computing wheel 86 to engage and rotate a five-pointed pinion 90, rigid with which is a pinion 91 meshing with the computing wheel 86 of next higher denomination. Fixed to both 90 and 91, is a five-lobed wheel 92, held in normal position by a yielding detent 93, and adapted to be turned into engagement with an assisting or boosting device in the form of a constantly rotating soft-rubber or other roll 94, which turns the lobed wheel together with the two pinions fixed thereto, and the computing wheel 86 of next higher denomination, until detent 93 falls into the next notch in the five-lobed wheel. Said assisting roll 94 may be rotated by a shaft 95, having a bevel pinion 96, meshing with a bevel pinion 97 on an upright shaft 98, the latter having a bevel pinion 99 meshing with a bevel pinion 100 upon an inclined shaft 101, carrying at its lower end a bevel pinion 102 meshing with a pinion 103 on the shaft 36.

The computing wheels are mounted upon a carriage 104 sliding on rails 105 and connected by an arm 106 to the typewriter carriage 7; the shaft 95 being splined to roll 94, to permit the endwise travel of the latter with the carriage 104.

There also occurs during the downward movement of the said key 2, a vibration to the left at Fig. 3, of a cam 107, also fixed upon said rock shaft 30, and operating a bell-crank 108, an upstanding arm 108ª whereof engages a pin 109 projecting from a bar or slide 110, which is supported in a fixed cylindrical guide 111. Upon this slide 110 is a shoulder 112, which vibrates or closes an electrical spring-switch or contact 113, fixed by a screw 114 upon an insulating block 115; a non-conducting washer 116 being provided upon said switch to be engaged by said shoulder 112. This switch or contact 113 is thereby moved into engagement with a contact 117, secured by a screw 118 to said block 115, and preferably yielding. Wires 119 and 120 lead from 113 and 117 to the motor 31.

The bar 110, which closes the motor circuit, is temporarily locked in effective position by a latch 121, actuated by a spring 122; said latch entering a notch 123 in said bar to lock it. The latch is pivoted at 124. The loose engagement or connection of arm 108ª at 109 permits the return movement of the rock shaft 30 and arm 46, while the switch-closing bar or slide 110 remains stationary in effective position.

From the foregoing, it will be understood that at the depression of the key 2, the motor is started, the clutch pinion 38 begins to turn, and the clutch 40, 49 is opened. Moreover, the previously set pin 21 is restored to normal position by the arm 66; the pinion 41 however being ineffective, owing to the open condition of said clutch. Upon the return stroke of the key 2, the paper carriage 7 advances, releasing the shaft 30 from the control of latch 53, and the spring 55 restores the rock shaft 30 to normal position, thus withdrawing the arm 66 and closing the clutch 40, 49, so that the pinion 41 rotates the pin wheel 22 together with the computing mechanism connected thereto, to a point determined by the engagement of that pin 21 which was set by said key, with the counter-stop 63. Upon the wheel 22 being so arrested, the pinion 41 will revolve idly in the space between the adjacent pins 21. During the revolution of said wheel 22, the motor circuit is kept closed by reason of the latch 121 holding the circuit-closer 110 in effective position; but said pin 21, which was projected by said key, is adapted to engage a releasing-arm 125 on said latch 121, to turn the latter toward the left at Fig. 1, thereby withdrawing the latch from the notch 123 and permitting a spring 126 (shown diagrammatically at Fig. 5) to restore the member 110 to normal position, and permit the contact 113 to swing away from the contact 117, thereby opening the motor circuit, the revolution of pinion 41 ceasing as the motor comes to rest. This opening of the circuit occurs at the completion of the computing operation, so that it is sure that power shall be available throughout such operation. The clutch 40, 49 remains closed until another key 2 is operated.

When the machine is operated rapidly, the motor, in practice, may never stop; but upon cessation of operation of the machine, the motor comes to rest, and the objectionable noise of the gearing ceases, and a reduction in cost in running the motor is effected. It will be seen that any of the numeral keys 2 of the typewriter throws the motor into action to turn any computing wheel to an extent determined by the key itself, and that the release of said key will cause the motor to stop.

The contact or switch arm 113 is preferably made of very thin springy metal, which is flexed by the shoulder 112 from its normal open position to the closed position seen at Fig. 5. By making the arm thin, considerable flexing movement thereof may be secured without burdening the finger-keys. Upon the releasing movement of the member 112 effected by the spring 126, the arm 113 springs away from the contact 117, and the liability of objectionable sparking is nearly or practically eliminated. The arms 113 and 117 are so formed that when 117 is flexed by the pressure of 113 thereon, there is a slight endwise rubbing of 117 upon 113, due to the different paths in which the two tips move. This rubbing keeps the surfaces clean, as is desirable in electrical contacts.

Variations may be resorted to within the scope of the invention, and portions of the improvements may be used without others.

Having thus described my invention, I claim:

1. In a computing machine, the combination with computing mechanism, of a pinion for driving said computing mechanism, a motor normally in driving relation with said pinion, numeral keys, and devices settable by any one of said numeral keys for determining how far said computing pinion shall be driven by said motor and means for interrupting the driving relation between said motor and said computing pinion during the setting of said devices.

2. In a computing machine, the combination with computing mechanism, of a pinion for driving said computing mechanism, a motor normally in driving relation with said pinion, numeral keys, devices settable by any one of said numeral keys for determining how far said pinion shall be driven by said motor, means for interrupting the driving relation between said motor and said pinion during the setting of said devices, and means for subsequently restoring the driving relation between the motor and said pinion to enable the motor to drive the pinion as determined by the settable devices.

3. In a computing machine, the combination with computing mechanism, of a pinion for driving said computing mechanism, a motor normally in driving relation with said pinion, numeral keys, devices settable by any one of said keys for determining how far said pinion shall be driven by said motor, means for interrupting the driving relation between said motor and said pinion during the setting of said devices, and means controlled by any one of said keys for subsequently restoring the driving relation between said motor and computing pinion to enable the motor to drive the pinion as determined by the settable devices.

4. A computing machine having computing mechanism, a computing pinion for driving the same, and an electric motor for controlling said pinion, said motor having a normally open circuit; and comprising in combination, normally effective connections between the motor and computing pinion, and means controlled by a numeral key on its down-stroke for closing the motor circuit and determining how far said computing pinion shall be driven and making said connections ineffective, said key on its up-stroke controlling the restoration of said conditions for effecting a drive of the computing pinion by the motor.

5. A combined typewriting and computing machine having numeral keys, computing mechanism, a motor having a normally open circuit and a typewriter carriage controlling the seriatim drive of said computing mechanism by said motor; and comprising in combination, a computing pinion for driving said computing mechanism, means controlled by a numeral key for closing said circuit and determining how far said computing pinion shall be driven by said motor, said key subsequently controlling the feeding of said carriage and the connecting of the motor to the computing pinion for effecting a drive of the computing mechanism by the motor.

6. In a computing machine, the combination with a system of computing wheels and a driving means for turning them, of numeral keys for controlling said driving means, a motor having a normally open circuit, a clutch between said motor and said master wheel normally closed, means controlled by the keys for closing the motor circuit, opening the clutch, and limiting the movement of the driving means, means for subsequently closing the clutch, means dependent upon the movement of the driving means and independent of the clutch, for disconnecting the driving means from said motor at the completion of a movement of the driving means, and means for opening said circuit upon the disconnection of said driving means from said motor.

7. In a computing machine, the combination with computing mechanism, including a computation gear capable of being mutilated, of a drive pinion to mesh with said gear, a set of keys, means controlled by said keys to variably mutilate said gear, thereby to disconnect the pinion from the same at a point predetermined by the key operated, a source of power for driving the pinion a distance determined by the set pin, a clutch between said source of power and said drive pinion normally closed, and means actuated by any one of said keys on its down-stroke for opening said clutch and setting one of said pins.

8. The combination with a computation gear including a series of movable pins, of means for mutilating said gear by projecting any of said pins, a driving pinion to mesh with said gear, an electrical circuit including a motor to operate said pinion, said circuit being normally open, means controlled by the keys to close said circuit and project a pin to variably mutilate said gear thereby to disconnect the pinion from the same at the point of mutilation and means dependent upon the projected pin reaching a definite position during the movement of said gear for opening said circuit.

9. In a computing machine, the combination with computing mechanism, including a computation gear capable of being mutilated, if a set of numeral keys, a drive pinion to mesh with said gear, a source of power, a clutch between said source of power and said drive pinion, said clutch being normally closed, means controlled by said keys on their down-strokes to variably mutilate said gear and concomitantly restore the gear at the point where it was previously mutilated, thereby to reconnect said gear and said drive pinion and for opening said clutch and means controlled by said keys on their up-strokes for closing the same to reconnect the motor and drive pinion.

10. The combination of two primary elements consisting of a master wheel and a system of computing wheels, a carriage connected to one of said primary elements, a set of keys having means to feed said carriage, a computation gear connected to said master wheel and capable of being mutilated, a pinion to mesh with said gear, means to enable the keys to variably mutilate said gear, thereby to disconnect the pinion from the said gear at a point determined by the key operated, a power-rotated member, a normally closed clutch between said power-rotated member and said pinion, means to close said clutch by said carriage, and means to open the clutch by the depression of a key.

11. In a computing machine, the combination with a computation gear normally mutilated, of a pinion to mesh with said gear, a set of keys, means to enable the keys to variably mutilate said gear, thereby to disconnect the pinion from the same at a point determined by the key operated, means for enabling any of said keys to concomitantly restore the gear at the point where it was previously mutilated, thereby to reconnect said gear with said pinion, a series of normally ineffective stops settable by said keys concomitantly with the mutilation of said gear, a counter-stop, a power-rotated member, a normally closed clutch between said power-rotated member and said pinion, means for enabling said keys to open said clutch when restoring the gear where it was previously mutilated, a carriage controlled by said keys and coöperating with said computation gear, means controlled by said carriage for closing said clutch, a normally open electrical circuit including said power rotated member, means to enable said keys to close said circuit, and means dependent upon the operation of said gear for opening said circuit, so that the power-rotated member is idle when the pinion engages the mutilated part of the gear.

12. In a computing machine, the combination of a master wheel, a gang of computing wheels, a drive gear connected to said master wheel and capable of being mutilated, a pinion to mesh with said gear, a set of keys, a set of devices connected to said keys for enabling them to variably mutilate said gear, thereby to cause subsequent disconnection of the pinion from the gear at a point predetermined by the key operated, a power-rotated member, a normally closed clutch between said power-rotated member and said pinion, and means to enable said keys upon their down strokes to open said clutch and upon the up strokes to close said clutch.

13. In a computing machine, the combination with numeral keys and computing wheels, of a master wheel for turning said computing wheels seriatim, a device operated by said numeral keys for determining how far said master wheel shall turn at the depression of each numeral key, a motor for turning said master wheel, a normally closed clutch between said motor and said device, means operated by the depression of a numeral key for opening said clutch and positively starting said motor while said clutch is open, and means operated by said key-controlled device for later closing said clutch and positively opening said circuit when said master wheel has completed its turning.

14. A computing machine having computing mechanism and a normally idle motor for driving said computing mechanism, and comprising in combination numeral keys for determining how far said computing wheels shall be turned, connections between said motor and said computing wheels, a normally closed clutch in said connections, and means for starting said motor and opening said clutch on the down-stroke of a key, and for closing said clutch to drive said computing mechanism on the up-stroke of a key.

15. In a computing machine, the combination with numeral keys and computing wheels, of a motor, a normally open circuit for driving said motor, a gear wheel driven by said motor when turning, a mutilatable gear having a mutilated portion opposite said motor-driven gear wheel, a clutch between said motor-driven gear wheel and said motor, means for releasing said clutch and restoring said mutilatable gear with the depression of a numeral key, means for simultaneously starting said motor and for mutilating said gear at another point, so that when said point reaches the gear wheel the motor revolves idly, and means for making said clutch effective on the up-stroke of a numeral key and breaking said circuit when said motor-driven gear wheel has turned to bring the freshly mutilated portion opposite said motor-driven gear wheel, so that the circuit is broken as soon as the motor turns idly.

16. A computing machine having computing devices and a motor for driving said devices, and comprising in combination a key, a normally closed clutch between said motor and said computing devices, means for starting said motor and releasing said clutch on a down-stroke of a key, and means for closing said clutch on the up-stroke of said key.

17. A computing machine having computing devices and an electric motor for driving them, said motor having a normally open circuit, and comprising in combination a key, a normally closed clutch between said motor and said computing devices, means for starting said motor and releasing said clutch on the down-stroke of a key, means for closing said clutch on the up-stroke of said key, and means for breaking the circuit when said computing devices have been completely operated.

18. In a computing machine, the combination with computing wheels and numeral keys, of a motor for turning said wheels under the control of said keys, a connection between said motor and said computing wheels including a normally closed clutch, and means controlled from a numeral key for starting said motor on the down-stroke of a key and opening said clutch, and means controlling the subsequent closing of said clutch, whereby the computing wheels are driven by the motor.

19. In a computing machine, the combination with computing mechanism, of a motor for driving said mechanism, numeral keys, devices settable under the control of said keys for determining how far said computing mechanism shall be actuated by said motor, said keys acting on said settable devices during a part of their operation, and said motor acting on said computing mechanism during a subsequent part of a key operation, a normally effective connection between said motor and said computing mechanism, and means whereby any one of said keys may render said connections ineffective during the setting operation of a key.

20. In a computing machine, the combination with computing mechanism and a typewriting carriage, of a motor for driving said computing mechanism, numeral keys for determining how far said motor shall drive said computing mechanism, means controlled by said carriage for determining the time in the cycle of operation when said motor shall drive said computing mechanism, a normally effective connection between said motor and said computing mechanism, means controlled by any one of said numeral keys for rendering said connection ineffective while the key is determining how far said computing mechanism shall be driven, and means for restoring said connection after said carriage has determined the time in the cycle of operation when said motor shall drive said computing mechanism.

21. In a computing machine, the combination with computing mechanism and a typewriting carriage, of a motor for driving said mechanism, normally effective connections between said motor and said computing mechanism, numeral keys for determining how far said motor shall drive said computing mechanism and also controlling the letter-feeding movement of said carriage, means controlled by said keys on their down-strokes for determining how far said motor shall drive said computing devices and for rendering said connections ineffective, means controlled by said keys at the beginning of the up-stroke for controlling the step movement of said carriage, and means operated by said carriage, after it has completed its step movement, for rendering said connections again effective to control the drive of said computing mechanism by said motor.

22. In a computing machine, the combination with a system of computing wheels and a master wheel for turning them *seriatim*, a motor for driving said master wheel, normally effective connections between said motor and said master wheel, numeral keys, means controlled by said keys for determining how far said master wheel shall be turned by said motor, and the *seriatim* engagement of said master wheel with said computing wheels, said keys while controlling the extent of movement of said master wheel also acting to render said connections between said motor and said master wheel ineffective, means for rendering said connections again effective between said motor and said master wheel on said master wheel moving into engagement with the computing wheel to be turned, said connections remaining effective during the remaining portion of the key-stroke, whereby the time during which the computation may take place is prolonged.

23. In a computing machine, the combination with a system of computing wheels and a master wheel for turning them *seriatim*, a motor for driving said master wheel, a normally open circuit for said motor, normally effective connections between said motor and said master wheel, numeral keys, means controlled by said keys for closing said circuit, determining how far said master wheel shall be turned by said motor, and the *seriatim* engagement of said master wheel with said computing wheels, said keys while controlling the extent of movement of said master wheel also acting to render said connections between said motor and said master wheel ineffective, means for rendering said connections again effective between said motor and said master wheel on said master wheel moving into engagement with the computing wheel to be turned, said connections remaining effective during the remaining portion of the key-stroke, whereby the time during which the computation may take place is prolonged.

24. In a computing machine, the combination with a motor, of computing wheels and numeral keys, driving means for turning said computing wheels by said motor, a clutch between said motor and said computing wheels, driving means normally effective, a cam shaft under control of any key, a cam on said shaft, and means brought into action by said cam for making said clutch ineffective on the down stroke of the key and for making said clutch effective on the up stroke thereof.

25. In a computing machine, the combination with a motor normally idle, of computing wheels and numeral keys, driving means for turning said computing wheels by said motor, a clutch between said motor and said driving means normally effective, a cam shaft controlled by any key, two cams on said shaft, means controlled by one of said cams for starting said motor on the down stroke of the key, means controlled by the other of said cams for making said clutch ineffective on the down stroke, and means operated by the second cam operating on the up stroke of said key to render said clutch effective.

26. In a computing machine, the combination with a motor normally idle, of computing wheels arranged to be turned by the motor, numeral keys for determining how far said computing wheels shall be turned, a cam shaft operated by any key, a cam on said shaft for starting said motor, and a second cam on said shaft for automatically connecting said motor to drive said computing wheels after said motor has started.

27. In a computing machine, the combination with computing mechanism, of an indexing wheel for controlling the computing mechanism, indexing pins on said wheel for determining the amount of turning of said wheel, and thereby said computing mechanism, a motor, a circuit for said motor normally open, a key for setting any of said pins to determine how far the indexing wheel shall turn and closing said motor circuit, and a latch for holding said circuit closed, the set indexing pin directly engaging said latch to open the motor circuit.

28. In a computing machine, the combination with computing devices, of a motor for driving said computing devices, connections between said motor and said devices interruptible at two points, said connections being normally interrupted at one point and complete at the other point, numeral keys, means brought into action on the down stroke of any numeral key for determining how far said motor shall drive said computing devices and for completing said connections at the point at which they are normally interrupted, and interrupting said connections at the other point, and means brought into action on the up stroke of any numeral key for restoring said connections to normal.

29. In a computing machine, the combination with computing mechanism including an indexing wheel, of a motor for operating said computing mechanism, connections from said motor to the indexing wheel, said connections being normally interrupted at the indexing wheel, means for interrupting said connections at a point between said indexing wheel and said motor, numeral keys, means brought into action by any numeral key on its down stroke for controlling said indexing wheel, to determine the amount of its driving action by the motor and for rendering said connections effective at said indexing wheel and breaking said connections at said other point, and means brought into action by any numeral key on its up stroke for restoring said connections to normal.

30. In a computing machine, the combination with computing devices, of an indexing wheel constituting a gear which may be mutilated at different points, a motor for said computing devices normally idle, a circuit for said motor, a connection from said motor to said indexing wheel, a clutch in said connection to determine whether or not said indexing wheel shall be driven by said motor, numeral keys, and means controlled on the down stroke of any key for controlling the opening of said clutch and the closing of said motor circuit, so that said motor may start but does not immediately drive said indexing wheel, thereby allowing a change in condition of mutilation of said indexing wheel to take place.

31. In a computing machine, the combination with computing mechanism, of a pinion for driving said computing mechanism, a motor for driving said pinion, keys for determining how far said pinion shall drive said computing mechanism, and connections between said motor and said pinion and said computing mechanism, means for maintaining said connections during the turning of said pinion to effect computation, and irrespective of the speed of said pinion.

GUSTAVE O. DEGENER.

Witnesses:
J. E. DAVIDSON,
D. BAYLIS.